US007221698B2

(12) United States Patent
Kimata

(10) Patent No.: US 7,221,698 B2
(45) Date of Patent: May 22, 2007

(54) ADAPTIVE ARRAY ANTENNA RECEIVING APPARATUS

(75) Inventor: Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 793 days.

(21) Appl. No.: 09/987,555

(22) Filed: Nov. 15, 2001

(65) Prior Publication Data

US 2002/0097783 A1 Jul. 25, 2002

(30) Foreign Application Priority Data

Nov. 15, 2000 (JP) ............................ 2000-347388

(51) Int. Cl.
*H04B 1/00* (2006.01)

(52) U.S. Cl. ...................................................... 375/147

(58) Field of Classification Search ................ 375/130, 375/136, 142, 147, 148, 144, 150, 152, 143; 370/335–337, 342, 441, 320; 455/137, 132; 475/504, 502

See application file for complete search history.

(56) References Cited

U.S. PATENT DOCUMENTS 5,966,095 A * 10/1999 Hiramatsu et al. .......... 342/383
6,069,912 A * 5/2000 Sawahashi et al. ......... 375/142
6,075,808 A * 6/2000 Tsujimoto ................... 375/143
6,191,736 B1 * 2/2001 Yukitomo et al. .......... 342/383
6,205,166 B1 * 3/2001 Maruta et al. .............. 375/130
6,240,149 B1 * 5/2001 Yukitomo et al. .......... 375/347
6,289,062 B1 * 9/2001 Wang et al. ................ 375/346
6,385,181 B1 * 5/2002 Tsutsui et al. .............. 370/335
6,628,969 B1 * 9/2003 Rilling ....................... 455/561
6,665,286 B1 * 12/2003 Maruta et al. .............. 370/342
6,714,584 B1 * 3/2004 Ishii et al. .................. 375/148

(Continued)

FOREIGN PATENT DOCUMENTS

EP 0 582 233 A1 2/1994

(Continued)

OTHER PUBLICATIONS

Nobuyoshi Kikuma, Array Antenna Based Adaptive Signal Processing, Japan Science Press, Inc., Nov. 25, 1998, 1st edition, p. 40-48.

(Continued)

*Primary Examiner*—Emmanuel Bayard
(74) *Attorney, Agent, or Firm*—Sughrue Mion, PLLC

(57) ABSTRACT

In an adaptive array antenna receiving apparatus which is used in a CDMA communication system and which includes a predetermined number L (L is an integer greater than 1) of fingers, no correlation exists between respective fingers. An adaptive update algorithm of calculating an antenna weighting factor by the use of an N-order correlation matrix independently for the respective fingers is equivalent to an adaptive update algorithm of calculating an (N×L)-order correlation matrix. In the adaptive array antenna receiving apparatus, the antenna weighting factor is controlled by the use of the adaptive update algorithm independently for the respective fingers so that a mean square of a common error signal produced by a subtractor (8) after rake combination by a rake combining circuit (6) is minimized. In this manner, the amount of calculation in the adaptive update algorithm used in all MMSE control circuits is considerably reduced proportionally from $(NL)^2$ to $N^2L$. As a consequence, the processing load upon the DSP can be decreased.

8 Claims, 6 Drawing Sheets

U.S. PATENT DOCUMENTS

| | | | | |
|---|---|---|---|---|
| 6,792,033 | B1 * | 9/2004 | Maruta et al. | 375/148 |
| 2001/0038666 | A1 * | 11/2001 | Mesecher et al. | 375/148 |

FOREIGN PATENT DOCUMENTS

| | | | |
|---|---|---|---|
| EP | 0 896 441 | A2 | 2/1999 |
| EP | 0 949 769 | A1 | 10/1999 |
| EP | 0 984 507 | A2 | 3/2000 |
| EP | 1 185 003 | A2 | 3/2002 |
| JP | 11-266180 | A | 9/1999 |
| JP | H11-266180 | A | 9/1999 |
| JP | 11-298345 | A | 10/1999 |
| JP | H11-298345 | A | 10/1999 |
| JP | 2001-16148 | A | 1/2001 |
| JP | 2002-26787 | A | 1/2002 |
| JP | 2002-77008 | A | 3/2002 |
| WO | WO 97/20400 | A1 | 6/1997 |

OTHER PUBLICATIONS

Nobuyoshi Kimura, "Adaptive signal processing using array antennas", Japan, Kagaku Gijutsu Shuppan Co., Ltd., Nov. 25, 1998, 1st Edition, pp. 40-48.

H. Wang et al., "Adaptive Array Antenna Combined with Tapped Delay Line Using Processing Gain for Direct-Sequence/Spread-Spectrum Multiple Access System", IEICE Transactions, vol. J75-B11, No. 11, (1992), pp. 815-825.

S. Tanaka et al., "The Performance of Decision-Directed Coherent Adaptive Diversity in DS-CDMA Reverse Link", IEICE, Technical Report on Radio Communication System, RCS96-102, (Nov. 1996), pp. RCS96-102 with Abstract.

* cited by examiner

ADAPTIVE ARRAY ANTENNA RECEIVING APPARATUS

BACKGROUND OF THE INVENTION

This invention relates to an adaptive array antenna receiving apparatus and a method therefor and, in particular, to an adaptive array antenna receiving system in which a transmitted signal of a COMA system is received by a plurality of antenna elements forming an adaptive array antenna.

A CDMA (Code Division Multiple Access) system attracts attention as a radio transmitting system capable of considerably increasing a subscriber capacity. For example, a CDMA adaptive array antenna receiving apparatus used in the CDMA system is disclosed in Wang et at "Adaptive Array Antenna Combined with Tapped Delay Line Using Processing Gain for Direct-Sequence/Spread-Spectrum Multiple Access System" (IEICE Transactions, Vol. J75-BII, No. 11, pp. 815–825, 1992) and Tanaka et al "The Performance of Decision-Directed Coherent Adaptive Diversity in DS-CDMA Reverse Link" (IEICE, Technical Report on Radio Communication System, RCS96-102, November 1996). As disclosed in these articles, an antenna weight is controlled by the use of a weighting control error signal derived after despreading. In this manner, adaptive control is carried out so that an antenna directive pattern maximizing a received SIR (Signal to Interference Ratio) is formed to cancel an interference.

Referring to FIG. 1, description will be made of a related CDMA adaptive array antenna receiving apparatus in case where a common error signal is used. It is assumed here that the number of receiving antennas is equal to N (N being an integer not smaller than 2) and that the number of paths of a multipath is equal to L (L being an integer not smaller than 1). Consideration will be made about the k-th user (k being an integer greater than 1).

As illustrated in FIG. 1, the CDMA adaptive array antenna receiving apparatus comprises N receiving antennas 1-1 through 1-N forming an array antenna, (L-1) delay units 2-2 through 2-L corresponding to the second through the L-th paths of the multipath except the first path of the multipath, respectively, (N×L) despreading circuits 3-1-1 through 3-L-N corresponding to the first through the L-th paths of the multipath and the N receiving antennas 1-1 through 1-N, L antenna weighting/combining circuits 4-1 through 4-L, and a MMSE (Minimum Mean Square Error) control circuit 5 connected in common to the L antenna weighting/combining circuits 4-1 through 4-L, a reference signal producing circuit 7, an adder 6 E and a subtractor 8.

The N receiving antennas 1-1 through 1-N are arranged in close proximity to one another so that a plurality of the received signals are mutually correlated. The delay units 2-2 through 2-L serve to delay the signals propagated through the second through the L-th paths of the multipath and received by the N receiving antennas 1-1 through 1-N. The received signals are classified into the first through the L-th multipath received signals due to delay times in the first through the L-th paths of the multi path. The second through the L-th multipath received signals are supplied to the delay units 2-2 through 2-L, respectively, while the first multipath received signals are directly supplied to the despreading circuits 3-1-1 through 3-1-N. The delay units 2-2 through 2-L delay the second through the L-th muripath received signals in synchronism with the timing on the first path of the multipath to produce second through L-th delayed signals, Therefore, a delay unit 2-1 corresponding to the first path of the multipath is omitted in FIG. 1 because no delay is required.

The despreading circuits 3-1-1 through 3-1-N for the first path of the multipath are directly supplied with the signals received by the receiving antennas 1-1 through 1-N, respectively. The despreading circuits 3-2-1 through 3-2-N for the second path of the multipath are supplied with the second delayed signals produced by the delay unit 2-2. The despreading circuits 3-L-1 through 3-L-N for the L-th-path of the multipath are supplied with the L-th delayed signals produced by the delay unit 2-L. Thus, the despreading circuits 3-l-1 through 3-l-N for the l-th (l=2 to L) path of the multipath are supplied with the l-th delayed signals produced by the delay unit 2-l.

Supplied with the first multipath received signals directly from the receiving antennas 1-1 through 1-N and supplied with the second through the L-th delayed signals from the delay units 2-2 through 2-L, the despreading circuits 3-1-1 through 3-L-N produce despread signals. The despreading circuits 3 1-1 through 3-L-N send the despread signals to the antenna weighting/combining circuits 4-1 through 4-L and to the MMSE control circuit 5. Supplied with the despread signals, the antenna weighting/combining circuits 4-1 through 4-L produce weighted and combined signals. The adder 6 sums the outputs of the antenna weighting/combining circuits 4-1 through 4-L to produce a sum signal as a rake combined signal and supplies the rake combined signal to the subtractor 8.

Temporarily referring to FIG. 2, description will be made of the antenna weighting/combining circuits 4-1 through 4-L. Since the antenna weighting/combining circuits 4-1 through 4-L have the same structure, the antenna weightinglcombining circuit 4-1 alone will be described by way of example. As illustrated in FIG. 2, the antenna weighting/combining circuit 4-1 comprises a plurality of multipliers 9-1 through 9-N and an adder 10.

As described above, the antenna weightingicombining circuit 4-1 is supplied with the despread signals despread by the despreading circuits 3-1-1 through 3-1-N. Supplied with the despread signals and antenna weights produced by the MMSE control circuit 5, the multipliers 9-1 through 9-N multiply the despread signals by the antenna weights to produce weighted signals. The adder 10 sums the weighted signals to produce the sum of the weighted signals as an antenna combined signal and supplies the antenna combined signal to the adder 6 in FIG. 1. By controlling amplitudes and phases of the signals received by the receiving antennas 1-1 through 1-N, the antenna weightingicombining circuits 4-1 through 4-L form the directive pattern of the array antenna so that a desired signal component is given a gain and interference signal components are suppressed.

The adder 6 sums the output signals of the antenna weighting/combining circuits 4-1 through 4-L to produce the rake combined signal. Thus, rake combination is carried out. Supplied with the rake combined signal produced by the adder 6 and a reference signal produced by the reference signal producing circuit 7, the subtractor 8 subtracts the rake combined signal from the reference signal to obtain a common error signal. The subtractor 8 supplies the common error signal to the MMSE control circuit 5. Supplied with the common error signal from the subtractor 8 and the despread signals from the despreading circuits 31-1 through 3-L-N, the MMSE control circuit 5 controls the antenna weights so that a mean square of the common error signal is minimized.

Herein, the MMSE control circuit 5 controls or updates the antenna weights by the use of an adaptive update algorithm. In order to follow instantaneous channel fluctuation by controlling the antenna weights, a high-speed algorithm, for example, an RLS (Recursive Least Square) algorithm can be used as the adaptive update algorithm.

Description will be made of an operation of the signal received at the m-th symbol (at a time instant mT where T represents a symbol period) through the l-th (l=1 through L) path of the multipath for the k-th user. Herein, the despread signal derived from the signal received by the n-th (n=1 through N) receiving antenna through the l-th path of the multipath is represented by $y_{k,l,n}$(m). The despread signals $y_{k,l,n}$(m) are supplied to the antenna weighting/combining circuits 4-1 through 4-L. The multipliers 9-1 through 9-N in the antenna weighting/combining circuits 4-1 through 4-L multiply the despread signals $y_{k,l,n}$(m) by the antenna weights produced by the MMSE control circuit 5 to produce the weighted signals. The weighted signals are combined by the adder 10. The adder 10 produces the output signal as the antenna combined signal.

Let the antenna weight for the n-th receiving antenna be represented by $w_{k,l,n}$(m). Then, the antenna combined signal $z_{k,l}$(m) for the l-th path of the multipath and for the k-th user is given by:

$$z_{k,l}(m) = \sum_{n=1}^{N} y_{k,l,n}(m) w_{k,l,n} * (m), \tag{1}$$

where * represents a complex conjugate.

The adder 6 in FIG. 1 adds the antenna combined signals produced by the antenna weighting/combining circuits 4-1 through 4-L so that the rake combination is carried out. The rake combined signal $z_k$(m) for the k-th user is given by:

$$z_k(m) = \sum_{l=1}^{L} z_{k,l}(m). \tag{2}$$

The rake combined signal $z_k$(m) is supplied to the subtractor 8.

In accordance with the RLS algorithm and by the use of all input samples up to the current time instant, the MMSE control circuit 5 controls the antenna weights so that a square sum of exponential weight errors is directly minimized. The square sum $\hat{Q}$(m)is represented by:

$$\overline{Q}(m) = \sum_{i=1}^{m} \alpha^{m-i} |e_k(m)|^2 \tag{3}$$

Herein, α represents a weighting factor (0<α≦1) and $e_k$(m) represents the common error signal produced by the subtractor 8. As described above, the common error signal is obtained by subtracting the rake combined signal produced by the adder 6 from the reference signal produced by the reference signal producing circuit 7.

The subtractor 8 delivers the common error signal to the MMSE control circuit 6. The common error signal $e_k$(m) is given by:

$$e_k(m) = \hat{z}_k(m) - z_k(m), \tag{4}$$

where $\hat{z}_k$(m) represents the reference signal for the k-th user.

In the RLS algorithm, a correlation matrix $R_{xxk}$ is calculated by a time average of exponential weights according to Equation (3):

$$R_{xxk}(0) = \delta U \ (m=0) \tag{5}$$

$$R_{xxk}(m) = \alpha R_{xxk}(m-1) + X_k(m) X_k^H(m) \ (m=1, 2, 3, \ldots) \tag{6}$$

Herein, δ represents a positive constant, H, a complex conjugate transpose, U, a unit matrix. $X_k$(m) represents a despread signal vector of the despread signal produced by each of the despreading circuits 3-1-1 through 3-L-N and is defined by:

$$\begin{aligned} X_k(m) = [&y_{k,1,1}(m), y_{k,1,2}(m), \ldots, y_{k,1,n}(m), \\ &y_{k,2,1}(m), y_{k,2,2}(m), \ldots, y_{k,2,n}(m), \\ &\vdots \\ &y_{k,L,1}(m), y_{k,L,2}(m), \ldots, y_{k,L,n}(m)]^T \end{aligned} \tag{7}$$

Herein, T represents the transpose.

In accordance with the adaptive update algorithm, the MMSE control circuit 5 updates the antenna weights by the use of the common error signal $e_k$(m) produced by the subtractor 8 and the despread signals produced by the despreading circuits 3-1-1 through 3-L-N. In this updating operation, the antenna weights are adaptively controlled by a MMSE criterion so that the common error signal $e_k$(m) is minimized. The updating operation is represented by:

$$W_k(m) = W_k(m-1) + \gamma_k R_{xxk}^{-1}(m-1) X_k(m) e_k^*(m) \tag{8}$$

$$\gamma_k = \frac{1}{\alpha + X_k^H(m) R_{xxk}^{-1}(m-1) X_k(m)} \tag{9}$$

Herein, $W_k$(m) represents an antenna weight vector of the antenna weight produced by the MMSE control circuit 5 and is defined by:

$$\begin{aligned} W_k(m) = [&w_{k,1,1}(m), w_{k,1,2}(m), \ldots, w_{k,1,n}(m), \\ &w_{k,2,1}(m), w_{k,2,2}(m), \ldots, w_{k,2,n}(m), \\ &\vdots \\ &w_{k,L,1}(m), w_{k,L,2}(m), \ldots, w_{k,L,n}(m)]^T \end{aligned} \tag{10}$$

Equations (8) and (9) require the calculation of an inverse matrix $R_{xxk}^{-1}$ of the correlation matrix $R_{xxk}$. The inverse matrix $R_{xxk}^{-1}$ is calculated by the use of a matrix formula:

$$R_{xxk}^{-1}(0) = \delta^{-1} U \ (\text{m}=0) \tag{11}$$

$$R_{xxk}^{-1}(m) = \frac{1}{\alpha} R_{xxk}^{-1}(m-1) - \frac{R_{xxk}^{-1}(m-1) X_k(m) X_k^H(m) R_{xxk}^{-1}(m-1)}{\alpha^2 + \alpha X_k^H(m) R_{xxk}^{-1}(m-1) X_k(m)} \quad (m = 1, 2, 3, \ldots) \tag{12}$$

However, the above-mentioned technique is disadvantageous in the following respects. The MMSE control circuit 5 requires a large amount of calculation according to the adaptive update algorithm. Such a large amount of calculation imposes a large processing load upon a digital signal processor (DSP). This is because, since the common error signal is used, the adaptive update algorithm for controlling the antenna weights so as to minimize the mean square of the common error signal requires calculation of an (N×L)-order correlation matrix $R^{xxk}$.

SUMMARY OF THE INVENTION

It is an object of this invention to provide a CDMA adaptive array antenna receiving apparatus capable of reducing a processing load of a DSP by considerably reducing the amount of calculation in an adaptive update algorithm for calculating an antenna weighting factor.

Adaptive array antennas receiving apparatuses according to this invention and receiving methods according to this invention are as follows:

[1] An adaptive array antenna receiving apparatus which receives a CDMA transmitted signal by a plurality of antenna elements (1-1 to 1-N) forming an adaptive array antenna and which includes a predetermined number L of fingers, where L is an integer greater than one, the receiving apparatus comprising:

a predetermined number L of despreading means (3-1-1 to 3-L-N) forming the predetermined number of fingers, each of the predetermined number of despreading means being supplied with received signals from the antenna elements for despreading the received signals to produce despread signals;

a predetermined number L of weighting factor multiplying means (4-1 to 4-L) supplied with the despread signals from the predetermined number of despreading means, respectively, each of the predetermined number of weighting factor multiplying means being for multiplying the despread signals by weighting factors to produce a weighted signal;

combining means (6) supplied with the weighted signals from the predetermined number of weighting factor multiplying means for combining the weighted signals to produce a rake combined signal;

error signal producing means (8) supplied with the rake combined signal and a reference signal for calculating a difference between the rake combined signal and the reference signal to produce a common error signal representative of the difference; and a predetermined number L of control means (5-1 through 5-L) supplied with the despread signals from the predetermined number of despreading means, respectively, and with the common error signal in common and connected to the predetermined number of weighting factor multiplying means, each of the predetermined number of control means being for controlling the weighting factors for each of the predetermined number of weighting factor multiplying means so that a mean square of the common error signal is minimized.

[2] An adaptive array antenna receiving apparatus as described in paragraph [1], wherein each of the predetermined number of control means uses an RLS (Recursive Least Square) algorithm as an adaptive update algorithm for controlling the weighting factors for each of the predetermined number of weighting factor multiplying means.

[3] An adaptive array antenna receiving apparatus as described in paragraph [1], wherein the reference signal is a signal equivalent to a known pilot signal in case where each of the received signals is the known pilot signal.

[4] An adaptive array antenna receiving apparatus as described in paragraph [3], further comprising deciding means (11) for making a data decision upon the rake combined signal produced by the rake combining means to produce a decision output signal and switching means (12) for selectively switching the decision output signal produced by the deciding means and the reference signat, the switching means being controlled so that, when the received signal is the pilot signal and when the received signal is a data signal other than the pilot signal, the reference signal and the decision output signal are selected, respectively, to be supplied to the error signal producing means.

[5] An adaptive array antenna receiving apparatus as described in paragraph [1], wherein each of the predetermined number of control means controls the weighting factors for each of the predetermined number of weighting factor multiplying means by the use of an N-order (N being an integer not smaller than 2) correlation matrix in case where the antenna elements are N in number.

[6] An adaptive array antenna receiving apparatus as described in paragraph [1], wherein the predetermined number of despreading means which form the predetermined number of fingers correspond to a predetermined number L of paths of a multipath of the received signal from each of the antenna elements, the receiving apparatus further comprising delay means for delaying the received signal from each of the antenna elements by delay times corresponding to the paths of the multipath, respectively, to produce delayed signals which are supplied to corresponding ones of the predetermined number of despreading means, the corresponding ones of the predetermined number of despreading means corresponding to the paths of the multipath.

[7] An adaptive array antenna receiving apparatus which receives a CDMA transmitted signal by a plurality of antenna elements (1-1 to 1-N) forming an adaptive array antenna and which includes a predetermined number L of fingers, where L is an integer greater than one, the receiving apparatus comprising:

a predetermined number L of despreading means (3-1-1 to 3-L-N) forming the predetermined number of fingers, each of the predetermined number of despreading means being supplied with received signals from the antenna elements for despreading the received signals to produce despread signals;

a predetermined number L of weighting factor multiplying means (4-1 to 4-L) supplied with the despread signals from the predetermined number of despreading means, respectively, each of the predetermined number of weighting factor multiplying means being for multiplying the despread signals by weighting factors to produce a weighted signal;

combining means (6) supplied with the weighted signals from the predetermined number of weighting factor multiplying means for combining the weighted signals;

a predetermined number L of control means (5-1 through 5-L) supplied with the despread signals from the predetermined number of despreading means, respectively, and connected to the predetermined number of weighting factor multiplying means, each of the predetermined number of control means being for controlling the weighting factors for each of the predetermined number of weighting factor multiplying means.

[8] An adaptive array antenna receiving apparatus as described in paragraph [7], wherein each of the predetermined number L of control means uses an SMI (Sample Matrix Inversion) algorithm as an adaptive update algorithm for controlling the weighting factors.

[9] An adaptive array antenna receiving apparatus as described in paragraph [7], wherein each of the predetermined number of control means controls the weighting factors for each of the predetermined number of weighting factor multiplying means by the use of an NBorder (N being an integer not smaller than 2) correlation matrix in case where the antenna elements are N in number.

[10] An adaptive array antenna receiving apparatus as described in paragraph [7], wherein the predetermined number of despreading means forming the predetermined number of fingers correspond to a predetermined number L of paths of a multipath of the received signal from each of the antenna elements, the receiving apparatus further comprising delay means for delaying the received signal from each of the antenna elements by delay times corresponding to the paths of the multipath, respectively, to produce delayed signals which are supplied to corresponding ones of the predetermined number of despreading means, the corresponding ones of the predetermined number of despreading means corresponding to the paths of the multipath.

[11] A receiving method for use in an adaptive array antenna receiving apparatus which receives a CDMA transmitted signal by a plurality of antenna elements (1-1 to 1-N) forming an adaptive array antenna and which includes first through L-th fingers, where L is an integer greater than one, the receiving method comprising:

first through L-th despreading steps (3-1-1 to 3-L-N) carried out in the first through the Lth fingers, each of the first through the L-th despreading steps being supplied with received signals from the antenna elements for despreading the received signals to produce despread signals;

first through L-th weighting factor multiplying steps (4-1 to 4-L) supplied with the despread signals from the first through the L-th despreading steps, respectively, each of the first through the L-th weighting factor multiplying steps being for multiplying the despread signals by weighting factors to produce a weighted signal;

a combining step (6) supplied with the weighted signals from the first through the L-th weighting factor multiplying steps for combining the weighted signals to produce a rake combined signal;

an error signal producing step (8) supplied With the rake combined signal and a reference signal for calculating a difference between the rake combined signal and the reference signal to produce a common error signal representative of the difference; and first through L-th control steps (5-1 through 5-L) supplied with the despread signals from the first through the L-th despreading steps, respectively, and with the common error signal in common, each of the first through the L-th control steps being for controlling the weighting factors for each of the first through the L-th weighting factor multiplying steps so that a mean square of the common error signal is minimized.

[12] A receiving method as described in paragraph [11], wherein each of the first through the L-th control steps uses an RLS (Recursive Least Square) algorithm as an adaptive update algorithm for controlling the weighting factors for each of the first through the L-th weighting factor multiplying steps.

[13] A receiving method as described in paragraph [11], wherein the reference signal is a signal equivalent to a known pilot signal in case where each of the received signals is the known pilot signal.

[14] A receiving method as described in paragraph [13], further comprising a deciding step (11) for making a data decision upon the rake combined signal produced by the rake combining step to produce a decision output signal and a switching step (12) for selectively switching the decision output signal produced by the deciding step and the reference signal, the switching step being controlled so that, when the received signal is the pilot signal and when the received signal is a data signal other than the pilot signal, the reference signal and the decision output signal are selected, respectively, to be supplied to the error signal producing step.

[15] A receiving method as described in paragraph [11], wherein each of the first through the L-th control steps controls the weighting factors for each of the first through the L-th weighting factor multiplying steps by the use of an N-order (N being an integer not smaller than 2) correlation matrix in case where the antenna elements are N in number.

[16] A receiving method as described in paragraph [11], wherein the first through the L-th fingers which carry out the first through the L-th despreading steps correspond to first through L-th paths of a multipath of the received signal from each of the antenna elements, the receiving method further comprising a delay step for delaying the received signal from each of the antenna elements by delay times corresponding to the paths of the multipath, respectively, to produce delayed signals which are supplied to corresponding ones of the first through the L-th despreading steps, the corresponding ones of the first through the L-th despreading steps corresponding to the first through the L-th paths of the multipath.

[17] A receiving method for use in an adaptive array antenna receiving apparatus which receives a CDMA transmitted signal by a plurality of antenna elements (1-1 to 1-N) forming an adaptive array antenna and which includes first through L-th fingers, where L is an integer greater than one, the receiving method comprising:

first through L-th despreading steps (3-1-1 to 3-L-N) carried out in the first through the L-th fingers, each of the first through the L-th despreading steps being supplied with received signals from the antenna elements for despreading the received signals to produce despread signals;

first through L-th weighting factor multiplying steps (4-1 to 4-L) supplied with the despread signals from the first through the L-th despreading steps, respectively, each of the first through the L-th weighting factor multiplying steps being for multiplying the despread signals by weighting factors to produce a weighted signal;

a combining step (6) supplied with the weighted signals from the first through the L-th weighting factor multiplying means for combining the weighted signals;

first through L-th control steps (5-1 through 5-L) supplied with the despread signals from the first through the L-th despreading steps, respectively, each of the first through the L-th control steps being for controlling the weighting factors for each of the first through the L-th weighting factor multiplying steps.

[18] A receiving method as described in paragraph [17], wherein each of the first through the L-th control steps uses an SMI (Sample Matrix Inversion) algorithm as an adaptive update algorithm for controlling the weighting factors.

[19] A receiving method as described in paragraph [17], wherein each of the first through the L-th control steps controls the weighting factors for each of the first through the L-th weighting factor multiplying steps by the use of an N-order (N being an integer not smaller than 2) correlation matrix in case where the antenna elements are N in number.

[20] A receiving method as described in paragraph [17], wherein the first through the L-th fingers which carries out the first through the L-th despreading steps correspond to first through L-th paths of a multipath of the received signal from each of the antenna elements, the receiving method further comprising a delay step for delaying the received signal from each of the antenna elements by delay times corresponding to the paths of the multipath, respectively, to produce delayed signals which are supplied to corresponding ones of the first through the L-th despreading steps, the corresponding ones of the first through the L-th despreading steps corresponding to the first through the L-th paths of the multipath.

In the CDMA communication system, no correlation exists among the respective fingers. Therefore, the adaptive update algorithm for calculating the antenna weighting factors by the use of an N-order correlation matrix independently for the respective fingers is equivalent to the adaptive update algorithm for calculating an (N×L)-order correlation matrix. Therefore, the antenna weighting factors are controlled by the use of the adaptive update algorithm independently for the respective fingers so as to minimize the mean square of the common error signal after rake combination. In this manner, the amount of calculation in the adaptive update algorithm used in all MMSE control circuits is considerably reduced proportionally from $(NL)^2$ to $N^2L$. As a consequence, the processing load upon the DSP can be decreased.

DESCRIPTION OF THE PREFERRED EMBODIMENTS

Figure 1:
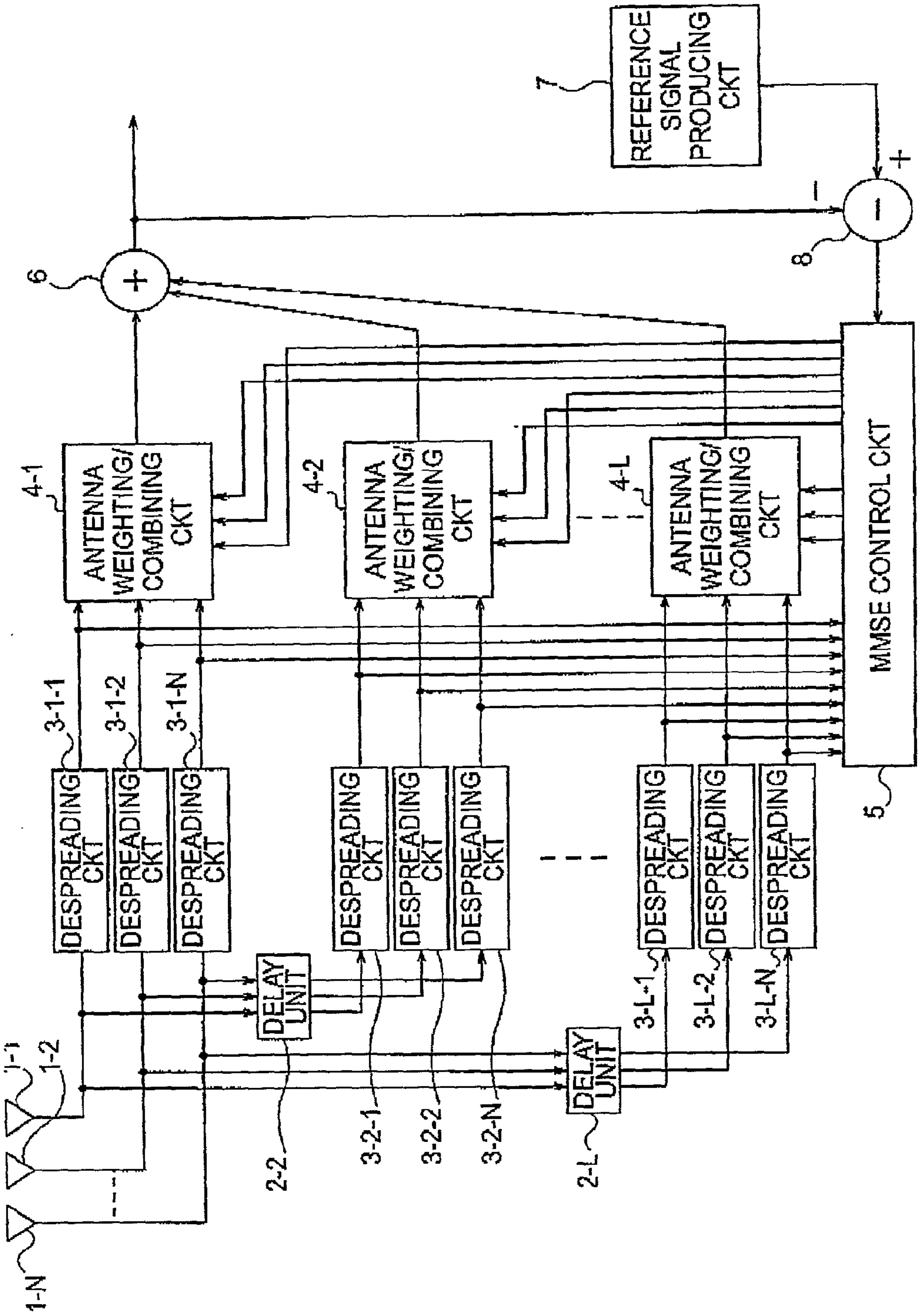
FIG. 1 RELATED ART
FIG. 1 shows a receiving apparatus according to a related art.
Figure 2:
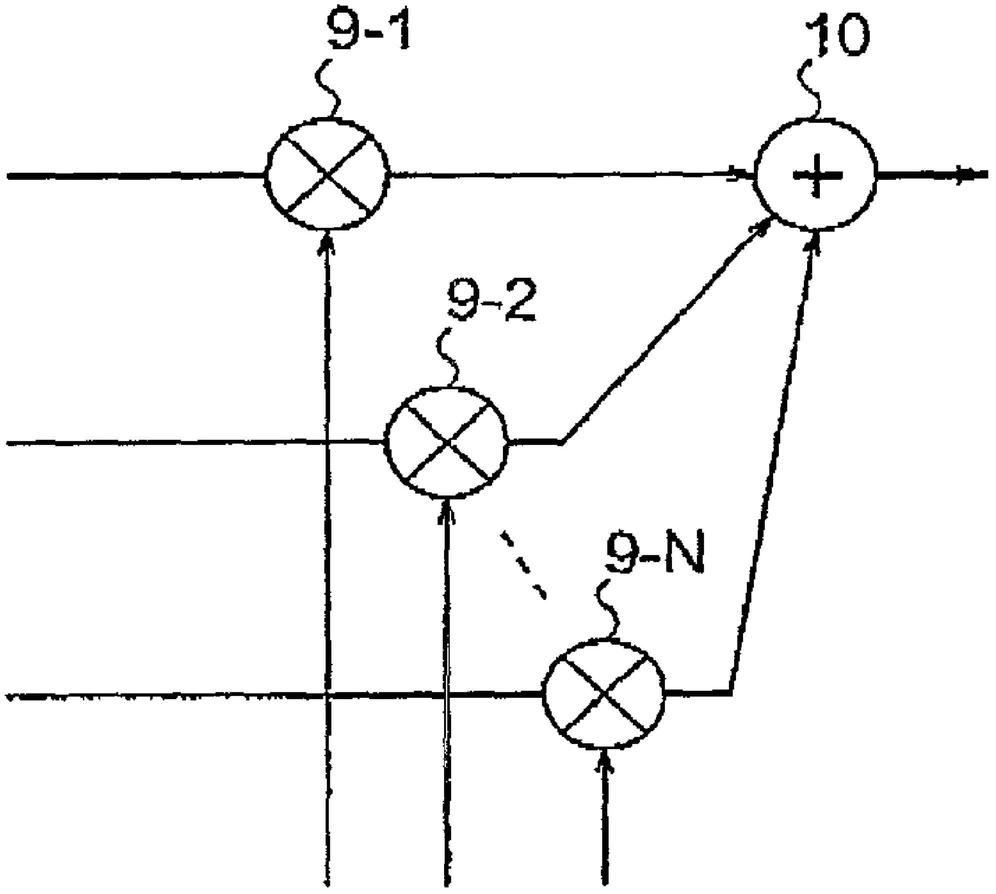
FIG. 2 RELATED ART
FIG. 2 shows an antenna weighting circuit illustrated in FIG. 1.

Now, description will be made of several preferred embodiments of this invention with reference to the drawing.

Figure 3:
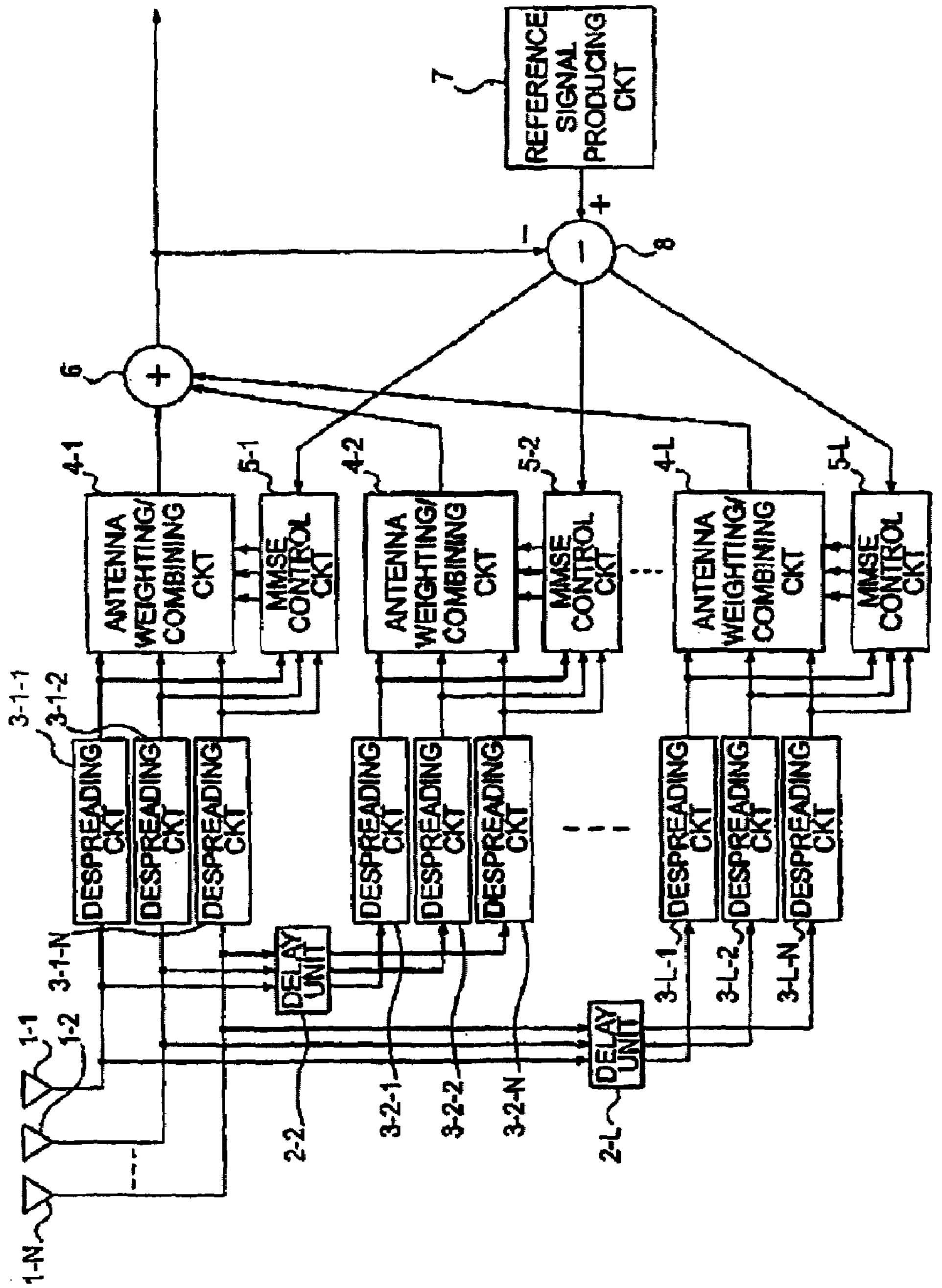
FIG. 3 shows a receiving apparatus according to the first embodiment of this invention.

Referring to FIG. 3, description will be made of a CDMA adaptive array antenna receiving apparatus according to the first embodiment of this invention in case where a common error signal is used. It is assumed here that the number of receiving antennas is equal to N (N being an integer not smaller than 2) and that the number of the paths of the multipath is equal to L (L being an integer not smaller than 1). Consideration will be made about the k-th user (k being an integer greater than 1).

As illustrated in FIG. 3, a CDMA adaptive array antenna receiving apparatus according to the first embodiment of this invention comprises N receiving antennas 1-1 through 1-N forming an array antenna, (L-1) delay units 2-2 through 2-L corresponding to the second through the L-th paths of a multipath except the first path of the multipath, respectively, (N×L) despreading circuits 3-1-1 through 3-L-N corresponding to the first through the L-th paths of the multipath and the N receiving antennas 1-1 through 1-N; L antenna weighting/combining circuits 4-1 through 4-L, and L MMSE control circuits 5-1 through 5-L connected to the first through the L-th antenna weighting/combining circuits 4-1 through 4-L, respectively, a reference signal producing circuit 7, an adder 6, and a subtractor 8.

In FIG. 3, the signals are received by the receiving antennas 1-1 through 1-N and classified into the first through the L-th multipath received signals due to delay times in the first through the L-th paths of the multipath. The second through the L-th multipath received signals are supplied to the delay units 2-2 through 2-L, respectively, while the first multipath received signals are directly supplied to the despreading circuits 3-1-1 through 3-1-N. The delay units 2-2 through 2-L delay the second through the L-th multipath received signals to produce the second through the L-th delayed signals. Supplied with the first multipath received signals from the receiving antennas 1-1 through 1-N and the second through the L-th delayed signals from the delay units 2-2 through 2-L, the despreading circuits 3-1-1 through 3-L-N despread the first multipath received signals and the second through the L-th delayed signals to produce despread signals. The despreading circuits 3-1-1 through 3-L-N deliver the despread signals to the antenna weighting/combining circuit 4-1 through 4-L and to the MMSE control circuits 5-1 through 5-L.

Supplied with the despread signals, the antenna weighting/combining circuits 4-1 through 4-L produce weighted and combined signals as antenna combined signals and supplies the antenna combined signals to the adder 6. The adder 6 sums the antenna combined signals to produce a sum signal as a rake combined signal and supplies the rake combined signal to the subtractor 8.

Figure 4:
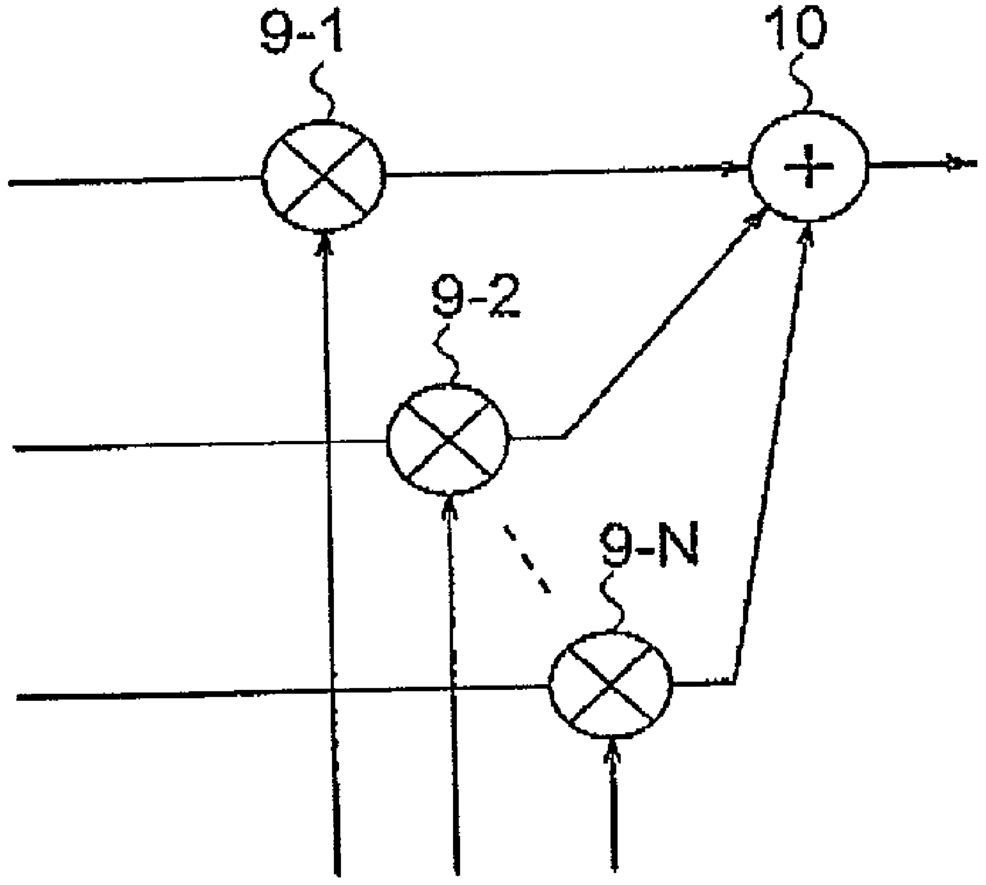
FIG. 4 shows an antenna weighting circuit illustrated in FIG. 3.

Temporarily referring to FIG. 4, each of the antenna weighting/combining circuits 4-1 through 4-L comprises a plurality of multipliers 9-1 through 9-N and an adder 10. As described above, the antenna weighting/combining circuits 4-1 through 4-L are supplied with the despread signals from the despreading circuits 3-1-1 through 3-L-N. The multipliers 9-1 through 9-N in each of the antenna weighting/combining circuits 4-1 through 4-L multiply the despread signals by antenna weights produced by each corresponding one of the MMSE control circuits 5-1 through 5-L to produce weighted signals. Supplied with the weighted signals from the multipliers 9-1 through 9-N, the adder 10 sums the weighted signals to produce the antenna combined signal. The antenna combined signal is delivered to the adder 6 in FIG. 3.

The adder 6 sums the antenna combined signals produced by the antenna weighting/combining circuits 4-1 through 4-L to produce the rake combined signal. Thus, rake combination is carried out. Supplied with the rake combined signal produced by the adder 6 and a reference signal produced by the reference signal producing circuit 7, the subtractor 8 subtracts the rake combined signal from the reference signal to obtain a common error signal. The subtractor 8 supplies the common error signal to the MMSE control circuits 5-1 through 5-L. Supplied with the common error signal from the subtractor 8 and the despread signals from the despreading circuits 3-1-1 through 3-L-N corresponding to the respective paths of the multipath, the AMMSE control circuits 5-1 through 5-L control the antenna weights so that a mean square of the common error signal is minimized.

Herein, the MMSE control circuits 5-1 through 5-L control or update the antenna weights by the use of an adaptive update algorithm. In order to follow instantaneous channel fluctuation by controlling the antenna weights, an RLS (Recursive Least Square) algorithm as a high-speed algorithm is preferably used. The algorithm for controlling the antenna weights using an N-order correlation matrix independently for the respective fingers contributes to considerable reduction in amount of calculation and in processing load upon a DSP.

Referring to FIGS. 3 and 4, the receiving apparatus will be described more in detail.

The receiving antennas 1-1 through 1-N receive the received signals each of which includes a desired signal component and a plurality of interference signal components multiplexed therewith. The receiving antennas 1-1 through 1-N are arranged in close proximity to one another so that the received signals are mutually correlated. The delay units 2-2 through 2-L serve to delay the received signals propagated through the second through the L-th paths and received by the receiving antennas 1-1 through 1-N. The received signals are classified into the first through the LAth multipath received signals with reference to delay times in the first through the L-th paths of the multipath. The second through the L-th multipath received signals are supplied to the delay units 2-2 through 2-L, respectively, while the first multipath received signals are directly supplied to the despreading circuits 3-1-1 through 3-1-N.

The delay units 2-2 through 2-L delay the second through the L-th multipath received signals in synchronism with the timing on the first path of the multipath to produce second through L-th delayed signals. Therefore, a delay unit 2-1 corresponding to the first path of the multipath is omitted in FIG. 3 because no delay is required.

The despreading circuits 3-1-1 through 3 1-N for the first path of the multipath are directly supplied with the first multipath received signals received by the receiving antennas 1-1 through 1-N, respectively. The despreading circuits 3-2-1 through 3-2-N for the second path of the multipath are supplied with the second delayed signals produced by the delay unit 2-2. The despreading circuits 3-L-1 through 3-L-N for the L-th paths of the multipath are supplied with the L-th delayed signals produced by the delay unit 2-L. Thus, the despreading circuits 3-l-1 through 3-l-N for the l-th (l=2 to L) path of the multipath are supplied with the l-th delayed signals produced by the delay units 2-l. The timing in a particular path of the multipath is used in common by all of the receiving antennas 1-1 through 1-N. This is because the receiving antennas 1-1 through 1-N are arranged in close proximity to one another so that the received signals are mutually correlated and, therefore, the receiving antennas 1-1 through 1-N are assumed to have the same delay profile.

Supplied with the first multipath received signals directly from the receiving antennas 1-1 through 1-N and supplied with the second through the L-th delayed signals from the delay units 2-2 through 2-L, the despreading circuits 3-1-1 through 3-L-N produce the despread signals. The despreading circuits 3-1-1 through 3-L-N send the despread signals to the antenna weighting/combining circuits 4-1 through 4-L and to the MMSE control circuits 5-1 through 5-L. Supplied with the despread signals, the antenna weighting/combining circuits 4-1 through 4-L produce weighted and combined signals as the antenna combined signals and deliver the antenna combined signals to the adder 8. The adder 6 sums the weighted and combined outputs to produce a sum signal as a rake combined signal and supplies the rake combined signal to the subtractor 8.

Temporarily referring to FIG. 4, description will be made of the antenna weighting/combining circuits 4-1 through 4-L. Since the antenna weighting/combining circuits 4-1 through 4-L have the same structure, the antenna weighting/combining circuit 4-1 alone will be described by way of example.

As illustrated in FIG. 4, the antenna weighting/combining circuit 4-1 comprises the multipliers 9-1 through 9-N and the adder 10. The antenna weighting/combining circuit 4-1 is supplied with the despread signals despread by the despreading circuits 3-1-1 through 3-1-N. Supplied with the despread signals and antenna weights produced by the MMSE control circuit 5-1, the multipliers 9-1 through 9-N multiply the despread signals by the antenna weights to produce the weighted signals. The adder 10 sums the weighted signals to produce the antenna combined signal and supplies the antenna combined signal to the adder 6 in FIG. 3.

By controlling amplitudes and phases of the signals received by the receiving antennas 1-1 through 1-N, the antenna weighting/combining circuits 4-1 through 4-L form the directive pattern of the array antenna so that the desired signal component is given a gain and the interference signal components are suppressed. The adder 6 sums the antenna combined signals produced by the antenna weighting/combining circuits 4-1 through 4-L. Thus, rake combination is carried out. Supplied with the rake combined signal produced by the adder 6 and the reference signal produced by the reference signal producing circuit 7, the subtractor 8 subtracts the rake combined signal from the reference signal to obtain the common error signal. The subtractor 8 supplies the common error signal to the MMSE control circuits 5-1 through 5-L. Supplied with the common error signal from the subtractor 8 and the despread signals from the despreading circuits 3-1-1 through 3-L-N corresponding to the respective paths of the multipath, the MMSE control circuits 5-1 through 5-L control the antenna weights so that the mean square of the common error signal is minimized.

Herein, the MMSE control circuits 5-1 through 5-L control or update the antenna weights by the use of the adaptive update algorithm. In order to follow instantaneous channel fluctuation by controlling the antenna weights, the RLS algorithm as a high-speed algorithm is preferably used. The algorithm for controlling the antenna weights using an N-order correlation matrix independently for the respective fingers is used.

Referring to FIGS. 3 and 4, an operation of this embodiment will be described. Herein, the RLS algorithm used in the MMSE control circuits 5-1 through 5-L will be described in detail. Consideration will be made of the operation of the signal received at the m-th symbol (at a time instant mT where T represents a symbol period) through the l-th (l=1 through L) path of the multipath for the k-th user.

In the RLS algorithm used in each of the MMSE control circuits & 1 through 5-L, the correlation matrix is calculated as follows:

$$R_{xxk,l}(0)=\delta U\ (m=0) \tag{13}$$

$$R_{xxk,l}(m)=\alpha R_{xxl,l}(m-1)+X_k,l(m)X_{k,}l^H(m)\ (m=1, 2, 3, \ldots) \tag{14}$$

Herein, δ represents a positive constant, H, a complex conjugate transpose, α, a weighting factor (0<α≦1).

If the weighting factor a is great, the accuracy and the stability of adaptive control are excellent but the convergence of adaptive control is slow. On the other hand, if the weighting factor α is small, the convergence of adaptive control is fast but the accuracy and the stability of adaptive control are deteriorated.

In the RLS algorithm used in each of the MMSE control circuits 6-1 through 5-L, the weighting factor a must adaptively be varied depending upon a fading frequency so that the instantaneous channel fluctuation is followed by the antenna weights. Specifically, if the fading frequency is small, the weighting factor α is increased. If the fading frequency is large, the weighting factor α is decreased.

$X_{k,l}(m)$ represents the despread signal vector of the despread signals produced by the despreading circuits 3-l-1 through 3-l-N corresponding to the l-th (l=1 through L) path of the multipath and is defined by:

$$X_{k,l}(m)=[Y_{k,l,1}(m),Y_{k,l,2}(m), \ldots Y_{k,l,n}(m)]^T, \tag{15}$$

where T represents a transpose.

In accordance with the RLS algorithm, each of the MMSE control circuits 5-1 through 5-L updates the antenna weights by the use of the common error signal $e_k(m)$ produced by the subtractor 8 and the despread signals produced by the despreading circuits 3-l-1 through 3-l-N (l=1 through L) corresponding to the respective paths of the multipath. As described above, the common error signal is obtained by subtracting the rake combined signal produced by the adder 6 from the reference signal produced by the reference signal producing circuit 7.

In this updating operation, the antenna weights are adaptively controlled by a MMSE criterion so that the common error signal $e_k(m)$ is minimized. The updating operation is represented by:

$$W_{k,l}(m)=W_{k,l}(m-1)+\gamma_{k,}R_{xxk,l}{}^{-1}(m-1)X_{k,l}(m)e_k{}^*(m) \quad (16)$$

$$\gamma_{k,l}=\frac{1}{\alpha+{}^{H}_{k,l}(m)R^{-1}_{xxk,l}(m-1)X_{k,l}(m)} \quad (17)$$

Herein, $W_{k,l}$ (m) represents an antenna weight vector of the antenna weight produced by the MMSE control circuit 5-l (l=1 through L) corresponding to the l-th path of the multipath and is defined by:

$$W_{k,l}(m)=[W_{k,l,1}(m),\ W_{k,l,2}(m),\ \ldots\ ,W_{k,l,n}(m)]^T \quad (18)$$

Equations (16) and (17) require the calculation of an inverse matrix of the correlation matrix $R_{xxk,l}$. In order to reduce the amount of calculation of the inverse matrix, the both sides of Equations (13) and (14) are transformed into the inverse matrix by the use of a matrix formula. Then, $R^{xxk,l-1}$ is given by:

$$R_{xxk,l}{}^{-1}(0)=\delta^{-1}U(\mathrm{m}=0) \quad (19)$$

$$R^{-1}_{xxk,l}(m)=\frac{1}{\alpha}R^{-1}_{xxk,l}(m-1)-\frac{R^{-1}_{xxk,l}(m-1)X_{k,l}(m)X^H_{k,l}(m)R^{-1}_{xxk,l}(m-1)}{\alpha^2+\alpha X^H_{k,l}(m)R^{-1}_{xxk,l}(m-1)X_{k,l}(m)} \quad (20)$$

$$(m=1,2,3,\ldots)$$

By the use of Equations (19) and (20) instead of Equations (13) and (14), it is possible to obtain $R_{xxk,l}{}^{-1}$ without an enormous amount of calculation of the inverse matrix. Thus, it is possible to reduce the amount of calculation required to calculate the antenna weights.

In the CDMA system, the multipath received signals are separated by spread codes and the correlation between the respective fingers is no longer present. Therefore, the RLS algorithm for calculating the antenna weights by the use of the N-order correlation matrix independently for the respective fingers is equivalent to the RLS algorithm for calculating an (N×L)-order correlation matrix. Hereinafter, it will be proved that the RLS algorithm used in the MMSE control circuits 5-1 through 5-L in the COMA adaptive array antenna receiving apparatus according to this invention is equivalent to the RLS algorithm used in the single MMSE control circuit 5 in the related CDMA adaptive array antenna receiving apparatus.

For brevity of description, consideration will be made of the case where the number of paths of a multipath is equal to 2, i.e., the number of fingers is equal to 2. In the related CDMA adaptive array antenna receiving apparatus, the correlation matrix $R_{xx}$ in case where the common error signal is used for all fingers is represented by a division matrix as follows:

$$R_{xx}=\begin{bmatrix}R_{11} & R_{12}\\ R_{21} & R_{22}\end{bmatrix} \quad (21)$$

Herein, $R_{11}$ represents an autocorrelation matrix of the finger 1, $R_{22}$, an autocorrelation matrix of the finger $\mathbf{2}_2R_{12}$, a cross-correlation matrix of the finger 1 to the finger 2, and $R_{21}$, a cross-correlation matrix of the finger 2 to the finger 1.

In the CDMA system, the respective paths of the multipath separated by the despreading have no correlation to one another. Therefore, the correlation between the respective fingers is given by $R_{12}=R_{21}=0$. Therefore, the correlation matrix $R_{xx}$ is represented by:

$$R_{xx}=\begin{bmatrix}R_{11} & 0\\ 0 & R_{22}\end{bmatrix} \quad (22)$$

Then, the inverse matrix $R_{xx}{}^{-1}$ of the correlation matrix $R_{xx}$ having diagonal elements alone is represented by:

$$R^{-1}_{xx}=\begin{bmatrix}R^{-1}_{11} & 0\\ 0 & R^{-1}_{22}\end{bmatrix} \quad (23)$$

In the related CDMA adaptive array antenna receiving apparatus, the RLS algorithm in case where the single MMSE control circuit 5 using the common error signal for all the fingers is given by:

$$W(m)=W(m-1)+\gamma R_{xx}{}^{-1}(m-1)X(m)e^*(m) \quad (24)$$

$$W(m)=[W_1(m),\ W_2(m)]^T \quad (25)$$

$$X(m)=[X_1(m),\ X_2(m)]^T \quad (26)$$

Herein, W(m) represents the weight vector for the finger 1 and the finger 2 at the m-th symbol, $W_1(m)$, the weight vector for the finger 1 at the m-th symbol, $W_2(m)$, the weight vector for the finger 2 at the m-th symbol, X(m) represents the despread signal vector for the finger 1 and the finger 2 at the m-th symbol, $X_1(m)$, the despread signal vector for the finger 1 at the m-th symbol, $X_2(m)$, the despread signal vector for the finger 2 at the m-th symbol, e(m), the common error signal.

The above equation is represented by the division matrix as follows:

$$\begin{bmatrix}W_1(m)\\ W_2(m)\end{bmatrix}=\begin{bmatrix}W_1(m-1)\\ W_2(m-1)\end{bmatrix}+\gamma\begin{bmatrix}R^{1}_{11}(m-1) & 0\\ 0 & R^{-1}_{22}(m-1)\end{bmatrix}\begin{bmatrix}X_1(m)\\ X_2(m)\end{bmatrix}e^*(m) \quad (27)$$

$$\begin{bmatrix}W_1(m)\\ W_2(m)\end{bmatrix}=\begin{bmatrix}W_1(m-1)\\ W_2(m-1)\end{bmatrix}+\gamma\begin{bmatrix}R^{-1}_{11}(m-1)X_1(m)\\ R^{-1}_{22}(m-1)X_2(m)\end{bmatrix}e^*(m)$$

The above equation shows that, if no correlation exists between the respective fingers, the RLS algorithm of calculating the (N×L)order correlation matrix is equivalent to the RLS algorithm of calculating the N-order correlation matrix independently for the respective fingers.

Next, it wilt be proved that optimum weights obtained by the MMSE control circuits 5-1 through 5-L in the CDMA adaptive array antenna receiving apparatus according to this invention are equivalent to optimum weights obtained by the single MMSE control circuit 5 in the related CDMA adaptive array antenna receiving apparatus.

From $W=R_{xx}^{-1}S$, the optimum weight is represented by the division matrix:

$$\begin{bmatrix} W_1 \\ W_2 \end{bmatrix} = \begin{bmatrix} R_{11}^{-1} & 0 \\ 0 & R_{22}^{-1} \end{bmatrix} \begin{bmatrix} S_1 \\ S_2 \end{bmatrix} = \begin{bmatrix} R_{11}^{-1} & S_1 \\ R_{22}^{-1} & S_2 \end{bmatrix} \tag{28}$$

$$W=[W_1,\ W_2]^T \tag{29}$$

$$S=[S_1,S_2]^T \tag{30}$$

Herein, W represents the weight vector for the finger 1 and finger 2, $W_1$ represents the weight vector for the finger 1, $W_2$ represents the weight vector for the finger 2, S represents the correlation vector for the finger 1 and finger 2, $S_1$ represents the correlation vector for the finger 1, $S_2$ represents the correlation vector for the finger 2.

The above equations show that, if no correlation exists between the respective fingers, the optimum weights calculated from the (N×L)-order correlation matrix is equivalent to the optimum weights calculated from the N-order correlation matrx independently for the respective fingers. For brevity of description, consideration has been made of the case where the number of the fingers is equal to 2. However, it is obvious that the above-mentioned proof is also valid for any number of fingers.

As described above, by utilizing the fact that no cross correlation exists between the respective paths of the multipath in the correlation matrix, a single (N×L)-order correlation matrix can be decreased in order number to N-order correlation matrices, L in number. Thus, the amount of calculation can be considerably reduced proportionally from $(NL)^2$ to $N^2L$. it is therefore possible to reduce the processing load upon the DSP.

Figure 5:
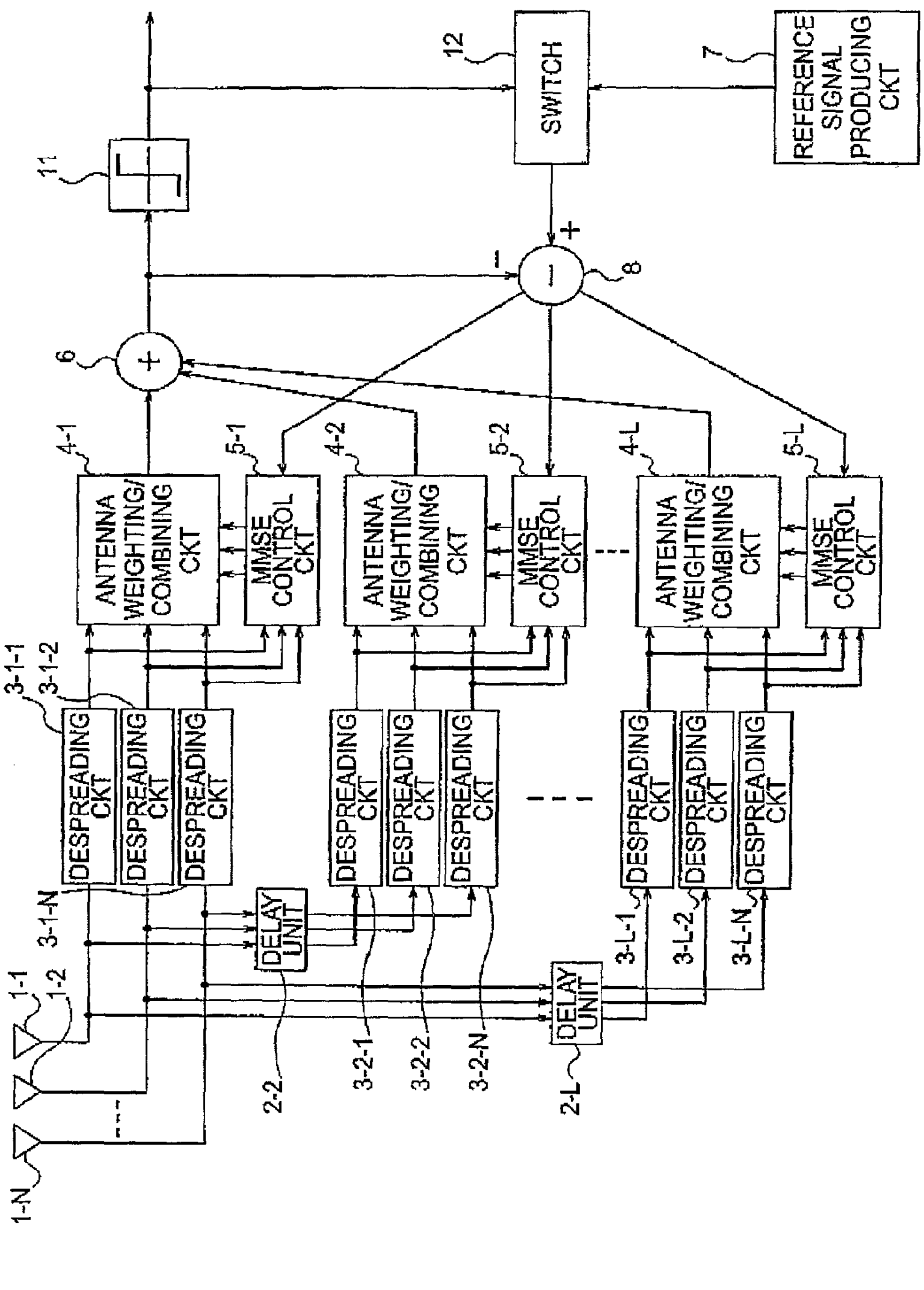
FIG. 5 shows a receiving apparatus according to the second embodiment of this invention.

Referring to FIG. 5, a CDMA adaptive array antenna receiving apparatus according to the second embodiment of this invention is basically similar in structure to that of the first embodiment. Similar parts are designated by like reference numerals. In FIG. 5, the receiving apparatus further comprises a deciding unit 11 for making a decision upon symbol data of the rake combined signal produced by the adder 6 and for producing a decision output signal and a switch 12 connected to the decision output signal and the reference signal of the reference signal producing circuit 7.

The deciding unit 11 is supplied with the rake combined signal from the adder 6 and makes the decision upon the symbol data. Thus, the common error signal is calculated by the use of not only the reference signal produced by the reference signal producing circuit 7 but also the decision output signal produced by the deciding unit 11. It is therefore possible to more quickly converge the antenna weights calculated in the MMSE control circuits 5-1 through 5-L according to the adaptive update algorithm.

Specifically, in the embodiment illustrated in FIG. 3, known pilot signals among the received signals are received as data signals. The pilot signals for the respective fingers are rakeombined to produce the rake combined signal. The rake combined signal is compared with the reference signal to produce the common error signal so that the antenna weights are controlled. On the other hand, the embodiment illustrated in FIG. 5 is applicable also to reception of other data signals than the pilot signals. Upon reception of the pilot signals, the switch 12 selects the reference signal from the reference signal producing circuit 7. Upon reception of other data signals, the switch 12 selects the decision output signal from the deciding unit 11 to be used instead of the reference signal.

This embodiment is the new advantage in that the antenna weights calculated in the MMSE control circuits 51 through 5-L according to the adaptive update algorithm can be more quickly converged.

As the adaptive update algorithm used in the MMSE control circuits 5-1 through 5-L, use may be made of an SMI (Sample Matrix Inversion) algorithm as another highspeed algorithm in order to follow instantaneous channel fluctuation by controlling the antenna weights. The use of the SMI algorithm exhibits the similar effect, i.e., considerable reduction in amount of calculation and in processing load upon the DSP.

Figure 6:
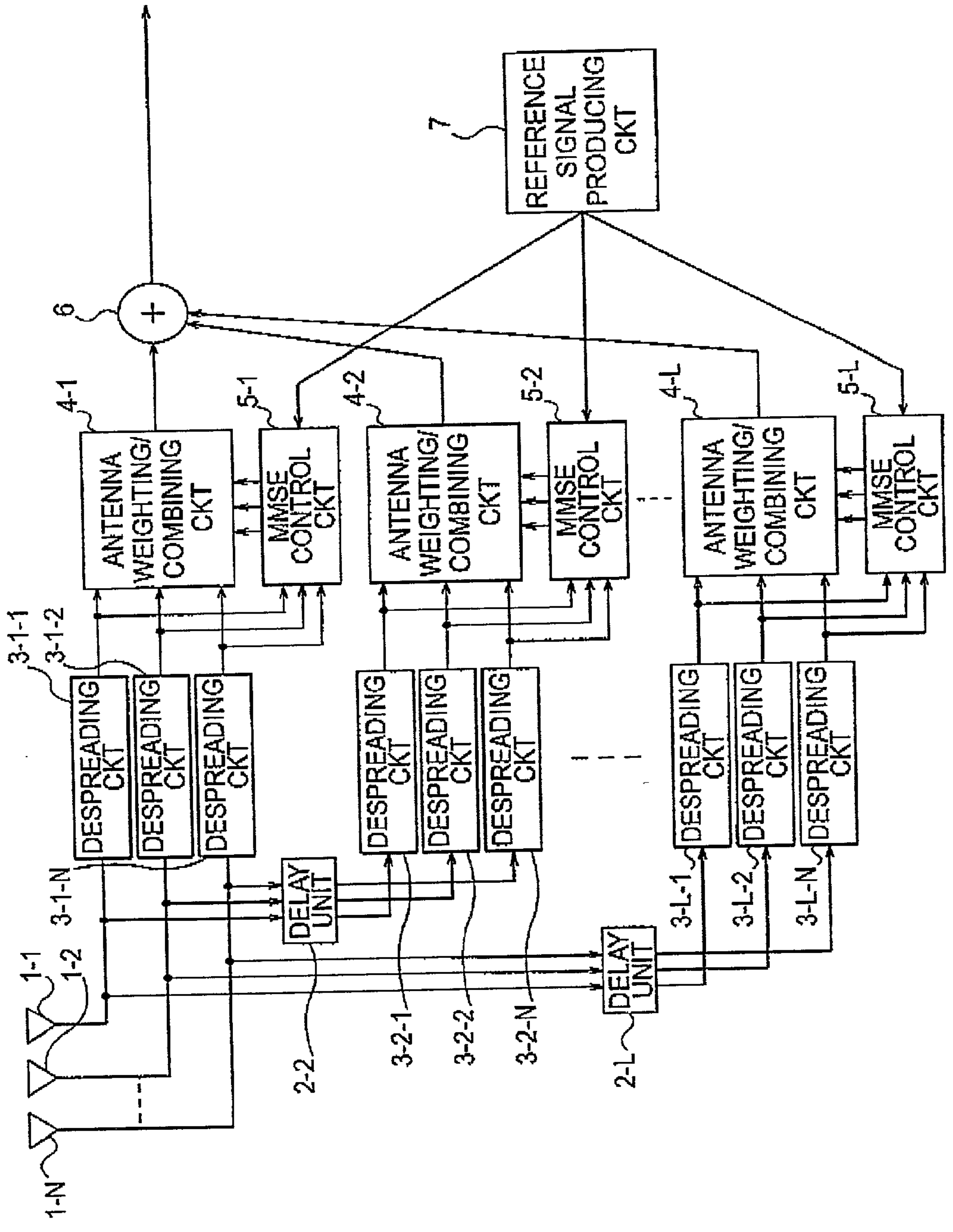
FIG. 6 shows a receiving apparatus according to the third embodiment of this invention.

Referring to FIG. 6, a COMA adaptive array antenna receiving apparatus according to the third embodiment of this invention will be described. In the third embodiment, the SMI algorithm is used as the adaptive update algorithm used in the MMSE control circuits 5-1 through 5-L. Similar parts are designated by like reference numerals.

In this embodiment, the subtractor 8 (FIG. 3) for calculating the common error signal by subtracting the rake combined signal produced by the adder 6 from the reference signal produced by the reference signal producing circuit 7 is omitted. Instead of the common error signal, the MMSE control circuits 5-1 through 5-L are supplied with the reference signal produced by the reference signal producing circuit 7. By the use of the reference signal and the despread signals produced by the despreading circuits 3-1-1 through 3-L-N corresponding to the respective paths of the multipath, the MMSE control circuits 5-1 through 5-L control the antenna weights.

Description will be made of an operation of the signal received at the m-th symbol (at the time instant mT where T represents the symbol period) through the l-th (l=1 through L) path of the multipath for the k-th user. In the SMI algorithm used in each of the MMSE control circuits 5-1 through 5-L, the correlation matrix $R_{xxk,l}$ is calculated as follows:

$$R_{xxk,}1\ (1)=X_{k,l}(1)+X_{k,l}^{H}(1)\ (\mathrm{m}=1) \tag{31}$$

$$R_{xxk,l}(m) = \beta R_{xxk,l}(m-1) + (1-\beta)X_{k,l}(m)X_{k,l}^{H}(m)\ (m = 2, 3, \ldots) \tag{32}$$

Herein, β is a forgetting factor (0<β<1) and has a characteristic similar to the weighting constant a used in the RLS algorithm.

The correlation vector $S_{k,l}$ is calculated by:

$$S_{k,l}(1)=X_{k,l}(1)\hat{Z}_k^*(1)(m=1) \tag{33}$$

$$S_{k,l}(m)=\beta S_{k,l}(m-1)+(1-\beta)X_{k,l}(m)\hat{Z}_k^*(m)\ (m=\mathbf{2},\ \mathbf{3}, \ldots) \tag{34}$$

where $\hat{Z}_k(m)$ represents the reference signal produced by the reference signal producing circuit 7.

Therefore, the antenna weights produced by the MMSER control circuits 5-1 through 5-L are given by:

$$W_{k,l}(m)=R_{xxk,l}^{-1}(m)S_{k,l}(m) \tag{35}$$

Equation (35) requires the calculation of the inverse matrix of the correlation matrix $R_{xxk,l}$. Therefore, in order to reduce the amount of calcufation of the inverse matrix, the both sides of Equation (32) are transformed into the inverse matrix by the use of the matrix formula. Then, the inverse matrix $R_{xxk,l}^{-1}$ is given by:

$$R_{xxk,l}^{-1}(m) = \frac{1}{\beta}R_{xxk,l}^{-1}(m-1) - \frac{(1-\beta)R_{xxk,l}^{-1}(m-1)X_{k,l}(m)X_{k,l}^{H}(m)R_{xxk,l}^{-1}(m-1)}{\beta^2+\beta(1-\beta)X_{k,l}^{H}(m)R_{xxk,l}^{-1}(m-1)X_{k,l}(m)} \quad (m=2, 3, \ldots) \tag{36}$$

By the use of Equation (36) instead of Equation (32), it is possible to obtain $R_{xxk,l}$ without an enormous amount of calculation of the inverse matrix. Thus, it is possible to reduce the amount of calculation required to calculate the antenna weights.

In case where the SMI algorithm is used as the adaptive update algorithm in the MMSE control circuits 5-1 through 5-L, no cross correlation exists between the respective paths of the multipath in the correlation matrix. Therefore, by reducing the order number from the single (N×L)order correlation matrix into the N-order correlation matrices, L in number, the amount of calculation can be considerably reduced proportionally from $(NL)^2$ to $N^2L$. Thus, the similar advantage of reducing the processing load upon the DSP is achieved.

According to this irvention, the antenna weighting factors are controlled by the use of the adaptive update algorithm independently for the respective fingers so as to minimize the mean square of the common error signal after rake combination. In this manner, the amount of calculation in the adaptive update algorithm used in all MMSE control circuits is considerably reduced proportionally from $(NL)^2$ to $N^2L$. As a consequence, the processing load upon the DSP can be decreased.

What is claimed is:

1. An adaptive array antenna receiving apparatus which receives a CDMA transmitted signal by a plurality of antenna elements forming an adaptive array antenna and which includes a plurality of fingers for receiving a multipath signal, said receiving apparatus comprising:

a plurality of despreading means forming said fingers, respectively each of said despreading means being connected to said antenna elements and supplied with received signals from said antenna elements for despreading the received signals to produce despread signals;

a plurality of weighting factor multiplying means also forming said fingers, respectively, and supplied with the despread signals from said despreading means, respectively, each of said weighting factor multiplying means multiplying the despread signals by weighting factors calculated for said antenna elements to produce a weighted signal for a corresponding one of said fingers;

combining means for combining the weighted signals, supplied from said weighting factor multiplying means to produce a rake combined signal;

error signal producing means supplied with the rake combined signal and a reference signal for calculating a difference between the rake combined signal and the reference signal to produce a common error signal representative of the difference; and a plurality of antenna weight control means also forming said fingers, respectively, and supplied with the despread signals from said despreading means included in corresponding ones of said fingers, respectively, and with the common error signal in common and connected to said weighting factor multiplying means included in corresponding ones of said fingers, each of said antenna weight control means being for controlling the weighting factors for each of said weighting factor multiplying means so that a mean square of the common error signal is minimized, wherein each of said antenna weight control means controls the weighting factors for each of said weighting factor multiplying means by using an N-order, where N is greater than or equal to two, correlation matrix as an adaptive update algorithm, wherein there are N antenna elements, and wherein the incoming direction of the multipath is obtained from the N-order, where N is greater than or equal to two, correlation matrix as an adaptive update algorithm.

2. An adaptive array antenna receiving apparatus as claimed in claim 1, wherein an RLS (Recursive Least Square) algorithm is used as an adaptive update algorithm.

3. An adaptive array antenna receiving apparatus as claimed in claim 1, wherein said reference signal is a signal equivalent to a known pilot signal and each of the received signals is the known pilot signal; and further comprising deciding means (11) for making a data decision upon the rake combined signal produced by said rake combining means to produce a decision output signal and switching means (12) for selectively switching the decision output signal produced by said deciding means and the reference signal, said switching means being controlled so that, when the received signal is the pilot signal and when the received signal is a data signal other than the pilot signal, the reference signal and the decision output signal are selected, respectively, to be supplied to said error signal producing means.

4. An adaptive array antenna receiving apparatus as claimed in claim 1, wherein each of said plurality of antenna weight control means uses an SMI (Sample Matrix Inversion) algorithm as an adaptive update algorithm for controlling the weighting factors.

5. A receiving method for use in an adaptive array antenna receiving apparatus which receives a CDMA transmitted signal by a plurality of antenna elements forming an adaptive array antenna and which includes a plurality of fingers for receiving a multipath signal, said receiving method comprising:

despreading steps carried out in said plurality fingers, respectively, each of said despreading steps being supplied with received signals from said antenna elements, for despreading the received signals to produce despread signals;

a plurality of weighting factor multiplying steps also forming said fingers, respectively supplied with the despread signals from said despreading steps, respectively, each of said plurality of weighting factor multiplying steps being for multiplying the despread signals by weighting factors calculated for said antenna elements to produce a weighted signal for corresponding one of said fingers;

a combining step for combining the weighted signals supplied from said weighting factor multiplying steps to produce a rake combined signal;

an error signal producing step supplied with the rake combined signal and a reference signal for calculating a difference between the rake combined signal and the reference signal to produce a common error signal representative of the difference; and antenna weight control steps supplied with the despread signals from said despreading steps, respectively, and with the common error signal in common, each of said antenna weight control steps being for controlling the weighting factors for each of said weighting factor multiplying steps so that a mean square of the common error signal is minimized, wherein each of said antenna weight control steps has a means for using an N-order, where N is greater than or equal to 2, correlation matrix as an adaptive update algorithm, where N is the number of antenna elements, and wherein the incoming direction of the multipath is obtained from the N-order, where N is greater than or equal to two, correlation matrix as an adaptive update algorithm.

6. A receiving method as claimed in claim 5, wherein each of said antenna weight control steps uses an RLS (Recursive Least Square) algorithm as an adaptive update algorithm for controlling the weighting factors for each of said first through said L-th weighting factor multiplying steps.

7. A receiving method as claimed in claim 5, wherein, said reference signal is a signal equivalent to a known pilot signal and each of said received signal is the known pilot signal; and further comprising a deciding step (11) for making a data decision upon the rake combined signal produced by said rake combining step to produce a decision output signal and a switching step (12) for selectively switching the decision output signal produced by said deciding step and the reference signal, said switching step being controlled so that, when the received signal is the pilot signal and when the received signal is a data signal other than the pilot signal, the reference signal and the decision output signal are selected, respectively, to be supplied to said error signal producing step.

8. A receiving method as claimed in claim 5, wherein each of said antenna weight control steps uses an SMI (Sample Matrix Inversion) algorithm as an adaptive update algorithm for controlling the weighting factors.

* * * * *

UNITED STATES PATENT AND TRADEMARK OFFICE

CERTIFICATE OF CORRECTION

PATENT NO. : 7,221,698 B2
APPLICATION NO. : 09/987555
DATED : May 22, 2007
INVENTOR(S) : Masayuki Kimata It is certified that error appears in the above-identified patent and that said Letters Patent is hereby corrected as shown below:

Column 1, line 9
Delete "COMA" and insert -- CDMA --

Column 1, line 60
Delete "multi path" and insert -- multipath --

Column 1, line 65
Delete "muripath" and insert -- multipath --

Column 2, lines 38 and 49
Delete "weightingcombining" and insert -- weighting/combining --

Column 10, line 48
Delete "AMMSE" and insert -- MMSE --

Column 13, line 56
Delete "COMA" and insert -- CDMA --

Column 16, line 25
Delete "COMA" and insert -- CDMA --

Column 17, line 1
Delete "MMSER" and insert -- MMSE --

Signed and Sealed this

Thirtieth Day of September, 2008

JON W. DUDAS
*Director of the United States Patent and Trademark Office*